(12) United States Patent
Ohata et al.

(10) Patent No.: US 11,817,573 B2
(45) Date of Patent: Nov. 14, 2023

(54) HYDROGEN ABSORBING ALLOY, NEGATIVE ELECTRODE COMPRISING SAME AND NICKEL-METAL HYDRIDE SECONDARY BATTERY COMPRISING SAME

(71) Applicant: FDK CORPORATION, Tokyo (JP)

(72) Inventors: Shota Ohata, Tokyo (JP); Jun Ishida, Tokyo (JP); Yuki Ehara, Tokyo (JP); Masaru Kihara, Tokyo (JP)

(73) Assignee: FDK CORPORATION, Tokyo (JP)

( * ) Notice: Subject to any disclaimer, the term of this patent is extended or adjusted under 35 U.S.C. 154(b) by 104 days.

(21) Appl. No.: 17/446,285

(22) Filed: Aug. 27, 2021

(65) Prior Publication Data

US 2022/0069285 A1 Mar. 3, 2022

(30) Foreign Application Priority Data

Aug. 31, 2020 (JP) .................................. 2020-145827
Jul. 28, 2021 (JP) .................................. 2021-123214

(51) Int. Cl.
| H01M 10/00 | (2006.01) |
| H01M 4/134 | (2010.01) |
| C22C 19/03 | (2006.01) |
| H01M 10/054 | (2010.01) |
| H01M 4/02 | (2006.01) |

(52) U.S. Cl.
CPC .............. *H01M 4/134* (2013.01); *C22C 19/03* (2013.01); *H01M 10/054* (2013.01); *C22C 2202/04* (2013.01); *H01M 2004/027* (2013.01)

(58) Field of Classification Search
CPC ...... H01M 50/489; H01M 10/28; H01M 4/70; H01M 10/30; H01M 50/409; H01M 50/491; Y02E 60/10
See application file for complete search history.

(56) References Cited

U.S. PATENT DOCUMENTS

| 2006/0046141 A1* | 3/2006 | Yasuoka ............. H01M 10/345 429/218.2 |
| 2010/0178561 A1 | 7/2010 | Kakeya et al. |
| 2010/0323243 A1 | 12/2010 | Yoshida et al. |
| 2011/0151320 A1 | 6/2011 | Ishida et al. |

FOREIGN PATENT DOCUMENTS

| CN | 105349841 A | 2/2016 |
| EP | 2214229 A1 | 8/2010 |
| JP | 2000030702 A | 1/2000 |
| JP | 2020009722 A * | 1/2020 ........ H01M 50/489 |

OTHER PUBLICATIONS

Kono S et al., Nickel Metal Hydride Battery, Jan. 2020, See the Abstract. (Year: 2020).*
Extended European Search Report dated Aug. 26, 2022, for corresponding European Application No. 21191085.6.

* cited by examiner

*Primary Examiner* — Cynthia H Kelly
*Assistant Examiner* — Monique M Wills
(74) *Attorney, Agent, or Firm* — Kinney & Lange, P.A.

(57) ABSTRACT

A nickel-metal hydride secondary battery includes an outer can and a group of electrodes housed in the outer can together with an alkaline electrolytic solution. The group of electrodes includes a positive electrode and a negative electrode that are superposed with a separator interposed therebetween, and the negative electrode includes a hydrogen absorbing alloy for nickel-metal hydride secondary batteries, the hydrogen absorbing alloy having a single composition and composed of a plurality of crystal phases.

4 Claims, 1 Drawing Sheet

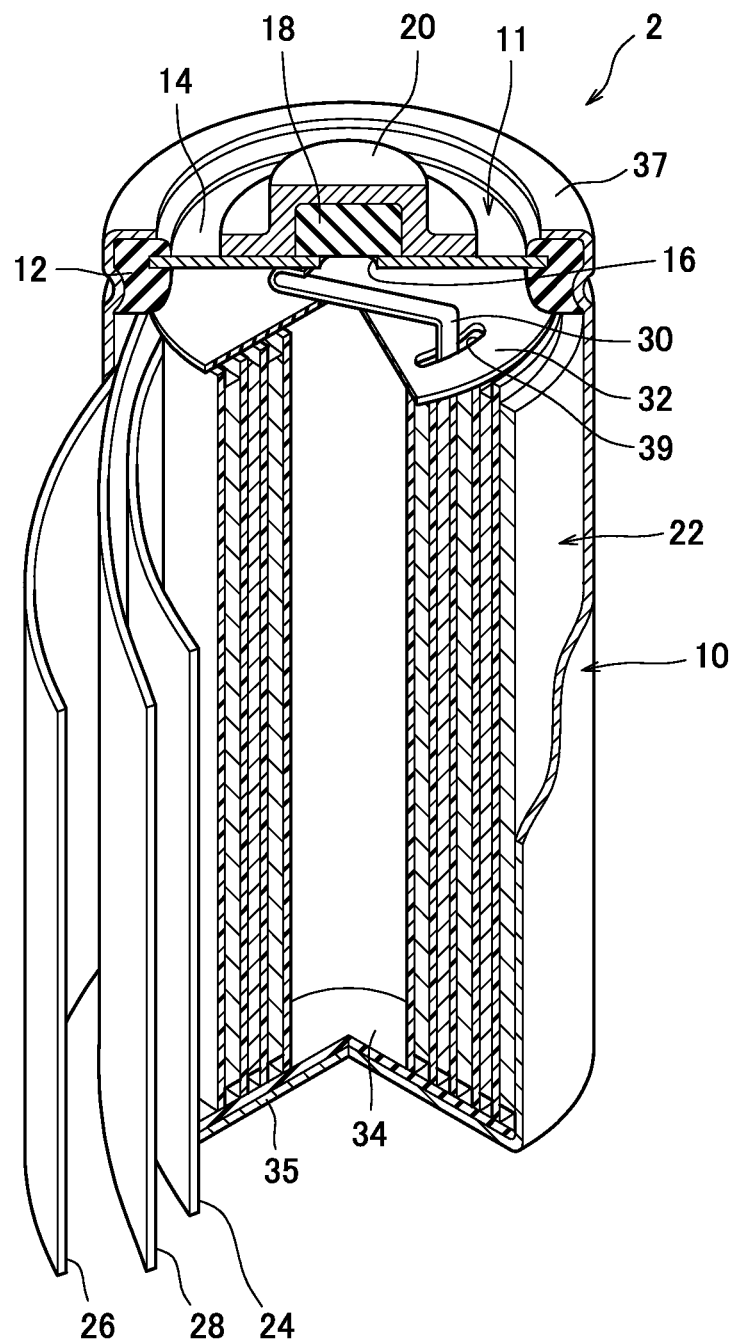

HYDROGEN ABSORBING ALLOY, NEGATIVE ELECTRODE COMPRISING SAME AND NICKEL-METAL HYDRIDE SECONDARY BATTERY COMPRISING SAME

CROSS-REFERENCE TO RELATED APPLICATION(S)

This application claims priority to Japanese Application No. 2020-145827 filed on Aug. 31, 2020, and also claims priority to Japanese Application No. 2021-123214 filed on Jul. 28, 2021, both of which are incorporated by reference in their entireties.

BACKGROUND

Technical Field

The present disclosure relates to a hydrogen absorbing alloy, a negative electrode comprising the same and a nickel-metal hydride secondary battery comprising the same.

Description of the Related Art

Nickel-metal hydride secondary batteries are known as types of alkaline secondary batteries. This nickel-metal hydride secondary battery has a higher capacity than a nickel-cadmium secondary battery and is also excellent in environmental safety, so that it has been used in various portable devices and various devices of hybrid electric vehicles, etc., expanding applications thereof. Due to such an expansion of applications, the nickel-metal hydride secondary batteries are desired to deliver higher performance.

One of the advanced performances required for nickel-metal hydride secondary batteries is low-temperature discharge characteristics. Here, the low-temperature discharge characteristics are degree of discharge in a low temperature environment, and a battery having excellent low-temperature discharge characteristics refers to a battery that can discharge a high capacity for a long time even in a low temperature environment.

A great deal of research has been carried out for nickel-metal hydride secondary batteries to improve low-temperature discharge characteristics, and for example, the nickel-metal hydride secondary battery as described in Japanese Patent Laid-Open No. 2000-030702 has been known. In Japanese Patent Laid-Open No. 2000-030702, an attempt has been made to improve the low-temperature discharge characteristics of the nickel-metal hydride secondary battery by using a method involving modification of surfaces of particles of the hydrogen absorbing alloy. In addition to this, improvement on the low-temperature discharge characteristics of nickel-metal hydride secondary batteries has been carried out by using a method involving improvement of a composition of a hydrogen absorbing alloy and a method involving reduction in particle sizes of the hydrogen absorbing alloy. When these methods are adopted, the activity of the surface of the hydrogen absorbing alloy is enhanced, accompanied by improvement on the reactivity of the negative electrode, which can exhibit favorable discharge characteristics even in a low temperature environment.

In the method for improving the low temperature discharge characteristics as described above, since the activity of the surface of the hydrogen absorbing alloy is basically enhanced, the reaction between the hydrogen absorbing alloy and an alkaline electrolytic solution tends to be excessive. Therefore, the corrosion of the hydrogen absorbing alloy is likely to proceed, bringing about the deterioration of the hydrogen absorbing alloy at an early stage. The deterioration of the hydrogen absorbing alloy renders difficult absorption/release of hydrogen, hinders the battery reaction, and shortens the cycle life of the battery at an early stage. Moreover, the reaction between the hydrogen absorbing alloy and the alkaline electrolytic solution accompanies consumption and decrease of the alkaline electrolytic solution. When the amount of the alkaline electrolytic solution is decreased, the battery is hardly discharged because the internal resistance thereof increases due to the drying out of the separator, resulting that the cycle life of the battery is shortened at an early stage.

As described above, if the surface activity of the hydrogen absorbing alloy is enhanced in order to improve the low-temperature discharge characteristics, the low-temperature discharge characteristics can be improved, however, there is the problem of lowering the cycle life characteristics.

Nickel-metal hydride secondary batteries are also required to have a long life so that they can withstand repeated use as many times as possible. Therefore, it is desired to develop a nickel-metal hydride secondary battery having both excellent low-temperature discharge characteristics and excellent cycle life characteristics.

SUMMARY

An aspect of the present disclosure is directed to a hydrogen absorbing alloy for nickel-metal hydride secondary batteries which has a single composition and is composed of a plurality of crystal phases.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 1 is a perspective view of the partially broken nickel-metal hydride secondary battery according to one embodiment.

DETAILED DESCRIPTION

One embodiment will be described below by way of an AA size cylindrical nickel-metal hydride secondary battery (hereinafter, referred to as a battery) 2 as shown in FIG. 1 as an example.

As shown in FIG. 1, battery 2 provides with an outer can 10 having a bottomed cylindrical shape with an open upper end. Outer can 10 has conductivity, and a bottom wall 35 thereof functions as a negative electrode terminal. A sealing assembly 11 is fixed to the opening of outer can 10. Sealing assembly 11 comprises a lid plate 14 and a positive electrode terminal 20, seals outer can 10, and provides positive electrode terminal 20. Lid plate 14 is a disk-shaped member having conductivity. Lid plate 14 and a ring-shaped insulating packing 12 surrounding lid plate 14 are arranged in the opening of outer can 10, and insulating packing 12 is fixed to an opening edge 37 of outer can 10 by caulking opening edge 37 of outer can 10. Namely, lid plate 14 and insulating packing 12 cooperate with each other to airtightly clog up the opening of outer can 10.

Here, lid plate 14 has a central through hole 16 in the center, and a rubber valve member 18 that clogs up central through hole 16 is arranged on the outer surface of lid plate 14. Further, metal positive electrode terminal 20 having a flanged cylinder shape so as to cover valve member 18 is electrically connected on the outer surface of lid plate 14. This positive electrode terminal 20 presses valve member 18 toward lid plate 14. Positive electrode terminal 20 is provided with a gas vent hole (not shown).

Normally, central through hole 16 is airtightly closed by valve member 18. On the other hand, when gas is generated in outer can 10 to increase the internal pressure thereof, valve member 18 is compressed by the internal pressure to open central through hole 16, resulting in releasing gas from outer can 10 to the outside through the gas vent holes (not shown) of central through hole 16 and positive electrode terminal 20. Namely, a safety valve system for battery 2 is configured by the combination of central through hole 16, valve member 18, and positive electrode terminal 20.

A group of electrodes 22 is housed in outer can 10. Group of electrodes 22 each comprises a band-shaped positive electrode 24, a negative electrode 26, and a separator 28. Specifically, positive electrode 24 and negative electrode 26 are spirally wound in a state of interposing separator 28 therebetween. Namely, positive electrode 24 and negative electrode 26 are superposed on each other with separator 28 interposed therebetween. The outermost circumference of group of electrodes 22 is formed by a part (outermost circumferential portion) of negative electrode 26, and contacts the inner circumferential wall of outer can 10. Namely, negative electrode 26 and outer can 10 are electrically connected to each other.

In outer can 10, a positive electrode lead 30 is arranged between one end of group of electrodes 22 and lid plate 14. Specifically, one end of positive electrode lead 30 is connected to positive electrode 24, and the other end is connected to lid plate 14. Therefore, positive electrode terminal 20 and positive electrode 24 are electrically connected to each other via positive electrode lead 30 and lid plate 14. A circular upper insulating member 32 is arranged between lid plate 14 and group of electrodes 22, and positive electrode lead 30 extends through a slit 39 provided in upper insulating member 32. Moreover, a circular lower insulating member 34 is also arranged between group of electrodes 22 and the bottom of outer can 10.

Further, a predetermined amount of an alkaline electrolytic solution (not shown) has been injected into outer can 10. Group of electrodes 22 is impregnated with this alkaline electrolytic solution so that the alkaline electrolytic solution promotes charge/discharge reactions between positive electrode 24 and negative electrode 26. As the alkaline electrolytic solution, an alkaline aqueous solution comprising, KOH, NaOH, LiOH, etc., as a solute is preferably used.

Examples of the material of separator 28 used include a polyamide fiber non-woven fabric to which a hydrophilic functional group has been imparted and non-woven fabric of fibers of polyolefin such as polyethylene or polypropylene to which a hydrophilic functional group has been imparted. Specifically, a non-woven fabric mainly composed of polyolefin fibers that has been subjected to sulfonation treatment to impart a sulfone group thereto is preferably used. Here, the sulfone group is imparted by treating the non-woven fabric with an acid comprising a sulfuric acid group, such as sulfuric acid or fuming sulfuric acid. A battery using such a separator comprising fibers having sulfone groups exhibits excellent self-discharge characteristics.

Positive electrode 24 comprises a conductive positive electrode substrate having a porous structure and a positive electrode mixture held in the pores of the positive electrode substrate.

Examples of the positive electrode substrate used as described above include a netlike, sponge-like or fibrous metal material that has been subjected to nickel plating, and foam nickel.

The positive electrode mixture comprises a positive electrode active material, a conductive material, a positive electrode additive, and a binder. This binder serves to bind the positive electrode active material, the conductive material, and the positive electrode additive, and also to bind the positive electrode mixture to the positive electrode substrate. Here, Examples of the binder used include carboxymethyl cellulose, methyl cellulose, PTFE (polytetrafluoroethylene) dispersion, and HPC (hydroxypropyl cellulose) dispersion.

The positive electrode active material particle is a nickel hydroxide particle or a higher-order nickel hydroxide particle. At least one of zinc, magnesium and cobalt preferably forms a solid solution in these nickel hydroxide particles.

As the conductive material, one or more selected from a cobalt compound and cobalt (Co) can be used, for example. Examples of the cobalt compound include cobalt oxide (CoO) and cobalt hydroxide ($Co(OH)_2$). This conductive material is added to the positive electrode mixture as needed. The conductive material may be added in the form of powder to the positive electrode mixture, or alternatively, may be included in the form of a coating layer covering the surface of the positive electrode active material in the positive electrode mixture.

The positive electrode additive is to be added in order to improve the characteristics of the positive electrode, and for example, yttrium oxide, zinc oxide, etc., can be used.

Positive electrode 24 can be produced, for example, as follows.

First, the conductive material, the positive electrode additive, water, and the binder are added to the positive electrode active material powder that is an aggregate of the particles of the positive electrode active material as described above, and the mixture is kneaded to prepare a positive electrode mixture slurry. The obtained positive electrode mixture slurry is filled in, for example, foam nickel and is subjected to drying treatment. After drying, the foam nickel filled with nickel hydroxide particles, etc., is rolled and then cut. In this way, positive electrode 24 carrying the positive electrode mixture is obtained.

Next, negative electrode 26 will be described.

Negative electrode 26 has a band-shaped conductive negative electrode substrate (core body), and the negative electrode mixture is held in this negative electrode substrate.

The negative electrode substrate is a sheet-shaped metal material in which through holes are distributed, and for example, a punching metal sheet or a sintered substrate obtained by molding and sintering metal powder can be used. The negative electrode mixture is not only filled in the through holes of the negative electrode substrate, but also held in the form of layers on both sides of the negative electrode substrate.

The negative electrode mixture comprises the particles of the hydrogen absorbing alloy, which enables to absorb and release hydrogen, as the negative electrode active material, the conductive material, and the binder. This binder serves not only to bind the particles of the hydrogen absorbing alloy, the negative electrode additive, and the conductive material to each other, but also to bind the negative electrode mixture to the negative electrode substrate. Here, a hydrophilic or hydrophobic polymer, for example, can be used as the binder, and carbon black or graphite can be used as the conductive material. Moreover, a negative electrode additive may be added as needed.

Here, the hydrogen absorbing alloy is generally a combination of a metal element having a high affinity for hydrogen (hereinafter referred to as an element A) and a metal element having a low affinity for hydrogen (hereinafter referred to as an element B), and it is classified according to the ratio of element A and element B ($AB_2$, $AB_3$, $AB_5$, etc.). The crystal phase also changes mainly depending on the ratio of these elements. Namely, a single crystal phase is generally obtained in a hydrogen absorbing alloy having a single composition. These crystal phases differ in the behavior of micronization (deterioration) of particles when hydrogen is repeatedly absorbed and released, and in general, a crystal phase having a higher ratio of element B to element A, such as a $CaCu_5$ type, is unlikely to cause micronization of particles when the absorption/release of hydrogen is repeated, and a crystal phase having a lower ratio of element B to element A, such as a $Ce_2Ni_7$ type, tends to cause the aforementioned micronization of particles.

When a hydrogen absorbing alloy is used for nickel-metal hydride secondary batteries, the behavior of micronization of particles in the crystal phase of the hydrogen absorbing alloy gives conflicting effects on the low-temperature discharge characteristics and the cycle life characteristics among the battery characteristics. Specifically, the crystal phase that is prone to micronization of particles has many highly active new surfaces, and therefore, the low-temperature discharge characteristics of the battery are enhanced when incorporated into a battery; however, the reaction with the alkaline electrolytic solution is excessive, lowering the cycle life characteristics. On the other hand, when the crystal phase that is unlikely to cause micronization of particles is incorporated into a battery, the reaction with the alkaline electrolytic solution is suppressed to some extent, so that the cycle life of the battery can be extended; however, the surface activity of the hydrogen absorbing alloy is low, therefore lowering the low-temperature discharge characteristics.

Since conventional hydrogen absorbing alloys each has a single crystal phase for a single composition, the nickel-metal hydride secondary batteries cannot but sacrifice the low-temperature discharge characteristics to some extent in order to extend the cycle life characteristics, and cannot but sacrifice the cycle life characteristics to some extent in order to extend the low-temperature discharge characteristics.

The present inventors have found, as a result of diligent experimentation aimed at achieving both low-temperature discharge characteristics and cycle life characteristics of nickel-metal hydride secondary batteries, that a hydrogen absorbing alloy in which a plurality of different crystal phases is combined even for a single composition can be obtained by changing the ratio of constituent elements, production conditions (casting method, heat treatment conditions), etc., and the present inventors thus have obtained a hydrogen absorbing alloy that has a single composition and is composed of a plurality of crystal phases. Since the hydrogen absorbing alloy according to the present application has the plurality of crystal phases, a crystal phase that contributes to the improvement of low-temperature discharge characteristics and a crystal phase that contributes to the improvement of cycle life characteristics co-exist. Namely, a crystal phase having high surface activity that contributes to the battery reaction and a crystal phase having resistance to the corrosion reaction caused by the alkaline electrolytic solution co-exist. Due to the co-existence of these crystal phases in a well-balanced manner, the nickel-metal hydride secondary battery in which the hydrogen absorbing alloy is adopted can increase the low-temperature discharge characteristics while maintaining the cycle life characteristics.

In the hydrogen absorbing alloy according to the present application, when a X-ray diffraction pattern for the plurality of crystal phases included in the alloy is measured by using Cu-Kα rays as an X-ray source, intensity ratio A represented by I1/I2 is in the range of 0.02≤A<0.14, and intensity ratio B represented by I3/I2 is in the range of 0.02<B<0.31, wherein I1 represents the intensity of diffraction peak at 2θ=30.3°, I2 represents the intensity of diffraction peak at 2θ=32.8°, and I3 represents the intensity of the diffraction peak at 2θ=31.5°. Here, the diffraction peak of 2θ=30.3° is assigned to a $CaCu_5$ type crystal phase, the diffraction peak of 2θ=31.5° is assigned to a $Ce_5Co_{19}$ type crystal phase, and the diffraction peak of 2θ=32.8° is assigned to a $Ce_2Ni_7$ type crystal phase. When these intensity ratios are within the above ranges, the nickel-metal hydride secondary battery incorporating such a hydrogen absorbing alloy is in a mode where the crystal phase having high surface activity that contributes to the battery reaction and the crystal phase having resistance to the corrosion reaction by the alkaline electrolytic solution co-exist in the well-balanced manner, which can improve the low-temperature discharge characteristics without lowering the cycle life characteristics of the nickel-metal hydride secondary battery.

As the hydrogen absorbing alloy according to the present application, a rare earth-Mg—Ni-based hydrogen absorbing alloy, which comprises a rare earth element, Mg and Ni, is used, for example. As the rare earth-Mg—Ni-based hydrogen absorbing alloy, specifically, a hydrogen absorbing alloy having the composition represented by the following general formula (I):

$$Ln_{1-x}Mg_xNi_{y-z}Al_z \tag{I}$$

wherein Ln represents at least one element selected from Zr and rare earth elements, and the subscripts x, y, and z satisfy the expressions x≤0.30, 3.3≤y≤3.6, and z≤0.25, respectively, is preferably used. Here, the aforementioned rare earth elements specifically refer to La, Ce, Pr, Nd, Pm, Sm, Eu, Gd, Tb, Dy, Ho, Er, Tm, Yb, Lu, Sc and Y.

Here, if x, y, and z, which represent the elemental ratios of Mg, Ni, and Al, respectively, are out of the above-described ranges of 0.30 or less, 3.3 or more and 3.6 or less, and 0.25 or less, respectively, the hydrogen absorbing alloy to be obtained will have a small storable amount of hydrogen and a high equilibrium pressure upon hydrogen absorption/release by the hydrogen absorbing alloy, and therefore, it cannot be applied to the negative electrode for nickel-metal hydride secondary batteries. Therefore, the subscripts x, y, and z are preferably within the above ranges. Moreover, the aforementioned rare earth element is preferably La alone. La is relatively inexpensive among rare earth elements and contributes to the reduction of the production cost of the hydrogen absorbing alloy.

The particles of the hydrogen absorbing alloy described above are obtained, for example, as follows.

First, the metal starting materials are weighed and mixed so that the resulting mixture has a predetermined composition. This mixture is melted in, for example, an induction melting furnace, and then cooled to form an ingot. The obtained ingot is heat-treated to be held at 900 to 1200° C. for 5 to 24 hours in an inert gas atmosphere. Subsequently, the ingot cooled to room temperature is mechanically pulverized in an inert gas atmosphere and sieved to obtain the particles of the hydrogen absorbing alloy having desired particle sizes.

Next, negative electrode 26 can be produced, for example, as follows.

First, powder of the hydrogen absorbing alloy, which is an aggregate of the particles of the hydrogen absorbing alloy, the conductive material, the binder, and water are kneaded to prepare a negative electrode mixture paste. The obtained negative electrode mixture paste is applied to the negative electrode substrate and dried. After drying, the negative electrode substrate to which the particles of the hydrogen absorbing alloy, etc., are attached is subjected to rolling and cutting, whereby negative electrode 26 is obtained.

Positive electrode 24 and negative electrode 26 obtained as described above are spirally wound with separator 28 interposed therebetween, whereby group of electrodes 22 is formed.

Group of electrodes 22 thus obtained is housed in outer can 10. Subsequently, a predetermined amount of the alkaline electrolytic solution is injected into outer can 10. After that, outer can 10 housing group of electrodes 22 and the alkaline electrolytic solution are sealed by lid plate 14 provided with positive electrode terminal 20 to obtain battery 2. The obtained battery 2 is subjected to an initial activation treatment to be ready for use.

EXAMPLES

1. Battery Production

Example 1

(1) Fabrication of Hydrogen Absorbing Alloy and Negative Electrode

First, La, Mg, Ni, and Al were weighed to prepare a mixture having a molar ratio of these of 0.763:0.237:3.30:0.10. The obtained mixture was melted in an induction melting furnace, and the molten metal was poured into a mold, and then cooled to room temperature (25° C.) to obtain an ingot of hydrogen absorbing alloy. The sample collected from this ingot was subjected to composition analysis by high frequency inductively coupled plasma spectroscopy (ICP). As a result, the composition of the hydrogen absorbing alloy was $La_{0.763}Mg_{0.237}Ni_{3.30}Al_{0.10}$.

Next, the obtained ingot was filled in a container, the inside of the container was substituted with argon gas, and then the container was sealed. This container was put into a heat treatment furnace and maintained at a temperature of 1000° C. for 10 hours to heat-treat the ingot in an argon gas atmosphere. After this heat treatment, the ingot of the hydrogen absorbing alloy cooled to room temperature was mechanically pulverized in an argon gas atmosphere to obtain hydrogen absorbing alloy powder, which was an aggregate of the particles of the hydrogen absorbing alloy. Here, the particle size of the obtained hydrogen absorbing alloy powder was measured by using a laser diffraction/scattering particle size distribution analyzer, resulting that the volume-average particle size (MV) of the particles of the hydrogen absorbing alloy was 65 μm.

Further, X-ray diffraction measurement (XRD measurement) was carried out for the obtained hydrogen absorbing alloy powder. A parallel beam X-ray diffractometer manufactured by Rigaku Corporation was used for the measurement. The measurement specifications in this case were as follows: X-ray source: Cu-Kα, tube voltage: 50 kV, tube current: 300 mA, scan speed: 1°/min, and sample rotation speed: 60 rpm. From the profile of the measurement results, peak intensity I1 of the diffraction peak of 2θ=30.3° assigned to the $CaCu_5$ type crystal phase, peak intensity I2 of the diffraction peak of 2θ=32.8° assigned to the $Ce_2Ni_7$ type crystal phase, and peak intensity I3 of the diffraction peak of 2θ=31.5° assigned to the $Ce_5Co_{19}$ type crystal phase were measured. Then, intensity ratio A represented by I1/I2, and intensity ratio B represented by I3/I2 were each calculated. The calculation results were shown in Table 1.

Next, to 100 parts by weight of the hydrogen absorbing alloy powder obtained as described above, 0.4 parts by weight of sodium polyacrylate, 0.1 parts by weight of carboxymethyl cellulose, 1.0 part by weight of a 50% solid styrene butadiene rubber (SBR) dispersion, 0.5 parts by weight of carbon black (hollow carbon black with hollow shell-like structures of primary particles, specifically, Ketjenblack® manufactured by Lion Specialty Chemicals Co., Ltd.), and 30 parts by weight of water were added, and the resultant was kneaded to prepare negative electrode mixture paste.

This negative electrode mixture paste was evenly applied to both sides of a perforated iron plate as a negative electrode substrate to uniform thicknesses. The perforated plate used had a thickness of 60 μm, and had a surface that had been subjected to nickel plating.

After the paste was dried, the perforated plate to which the hydrogen absorbing alloy powder was attached was further rolled to increase an amount of alloy per volume, and then cut to obtain a negative electrode 26 for an AA size.

(2) Fabrication of Positive Electrode Active Material and Positive Electrode

Nickel sulfate, zinc sulfate, magnesium sulfate and cobalt sulfate were weighed so that the amounts of zinc, magnesium, and cobalt were 3.0% by weight, 0.4% by weight, and 1.0% by weight, respectively, relative to nickel, and they were added to a 1N sodium hydroxide aqueous solution containing ammonium ions to prepare a mixed aqueous solution. While stirring the obtained mixed aqueous solution, a 10N sodium hydroxide aqueous solution was gradually added to the mixed aqueous solution to undergo a reaction, and the pH during the reaction here was stabilized at 13 to 14 to generate nickel hydroxide particles that included mainly nickel hydroxide and were in a state of solid solution formed by zinc, magnesium and cobalt. The obtained nickel hydroxide particles were washed three times with a 10-fold amount of pure water, and then subjected to a dehydration step and a drying step to obtain positive electrode active material powder that was an aggregate of nickel hydroxide particles. Here, the particle size of the obtained positive electrode active material powder was measured with a laser diffraction/scattering particle size distribution analyzer, resulting that the volume-average particle size (MV) of the particles of the positive electrode active material was 10 μm.

Next, 10 parts by weight of cobalt hydroxide, 0.5 parts by weight of yttrium oxide, 40 parts by weight of HPC (hydroxypropyl cellulose), 0.3 parts by weight of zinc oxide, and 30 parts by weight of water were mixed with 100 parts by weight of the positive electrode active material powder to prepare a positive electrode mixture slurry, and this positive electrode mixture slurry was filled in sheet-shaped foam nickel as a positive electrode substrate. After the positive electrode mixture slurry was dried, the foam nickel filled with the positive electrode mixture was rolled and then cut into a predetermined shape to obtain a positive electrode 24 for AA size.

(3) Assembly of Nickel-Metal Hydride Secondary Battery

The obtained positive electrode 24 and negative electrode 26 were spirally wound with separator 28 interposed therebetween to prepare group of electrodes 22. Separator 28 used here for fabricating group of electrodes 22 was a sulfonated polypropylene fiber non-woven fabric having a thickness of 0.1 mm (weight 53 g/m$^2$).

An aqueous solution containing KOH, NaOH and LiOH was provided as the alkaline electrolytic solution. Here, the alkaline electrolytic solution contained KOH, NaOH and LiOH in a ratio of KOH:NaOH:LiOH=5.0:1.5:1.0.

Next, group of electrodes 22 described above was housed in bottomed cylindrical outer can 10, and a predetermined amount of the prepared alkaline electrolytic solution was injected. After that, the opening of outer can 10 was clogged up with sealing assembly 11, and AA size nickel-metal hydride secondary battery 2 having a nominal capacity of 2300 mAh was assembled. Here, the nominal capacity was the discharging capacity of the battery, in an environment at a temperature of 25° C., when it was charged at 0.23 A for 16 hours and then discharged at 0.46 A until the battery voltage reached 1.0 V.

(4) Initial Activation Treatment

In an environment at a temperature of 25° C., the charge/discharge operation in which battery 2 was charged at 0.23 A for 16 hours and then discharged at 0.46 A until the battery voltage reached 1.0 V was repeated 5 times to carry out initial activation treatment. Battery 2 was ready for use in such a manner.

Examples 2 and 3, Comparative Examples 1 and 2

A nickel-metal hydride secondary battery was assembled in the same manner as in Example 1 except that intensity ratio A and intensity ratio B were set to the values shown in Table 1 by changing the heat treatment temperature of the hydrogen absorbing alloy.

2. Evaluation of Nickel-Metal Hydride Secondary Battery

Low-Temperature Discharge Characteristics

In an environment at 25° C., a charging current of 2.3 A was passed through each of the fabricated batteries of Examples 1 to 3 and Comparative Examples 1 and 2, and after the battery voltage reached the maximum value, each battery was charged until the battery voltage dropped by 10 mV, and then rested for 1 hour. Then, the battery after having rested for 1 hour was discharged in an environment at 25° C. at a discharging current of 2.3 A until the battery voltage reached 1.0 V. At this time, the discharging capacity was measured, and this discharging capacity was used as the initial capacity of the battery.

In an environment at 25° C., a charging current of 2.3 A was passed through each of the batteries of Examples 1 to 3 and Comparative Examples 1 and 2 after having measured the initial capacity, and after the battery voltage reached the maximum value, each battery was charged until the voltage dropped by 10 mV, and then rested for 3 hours in an environment at −10° C.

Next, the battery after having rested for 3 hours was discharged in an environment at −10° C. at a discharging current of 2.3 A until the battery voltage reached 1.0 V, and the discharging capacity at this time was determined. This discharging capacity was defined as the capacity in a low temperature environment.

Next, the ratio of the capacity in the low temperature environment at −10° C. and the capacity in the room temperature environment at 25° C. (initial capacity) was calculated by following equation (II):

$$\text{Low-temperature discharging capacity ratio} = \text{capacity in low temperature environment/initial capacity} \times 100 \quad \text{(II)}$$

This ratio was defined as the low-temperature discharging capacity ratio. The larger the value of the low-temperature discharging capacity ratio, the smaller the degree of decrease in the discharging capacity at low temperatures.

Here, the relative value of the low-temperature discharging capacity ratio of each battery to the low-temperature discharging capacity ratio in Comparative Example 1, the latter being regarded as 100, was obtained. The results are shown in Table 1 as the low-temperature discharge characteristics ratio.

A larger value of this low-temperature discharge characteristics ratio indicates that the battery has better low-temperature discharge characteristics.

(2) Cycle Life Characteristics

In an environment at 25° C., a charging current of 2.3 A was passed through each of the fabricated batteries of Examples 1 to 3 and Comparative Examples 1 and 2, and after the battery voltage reached the maximum value, each battery was charged until the battery voltage dropped by 10 mV and then rested for 1 hour. Then, each battery after having rested for 1 hour was discharged in an environment at 25° C. at a discharging current of 2.3 A until the battery voltage reached 1.0 V, and then rested for 1 hour. This charge/discharge cycle was repeated, and the number of cycles was counted. At this time, the discharging capacity in each cycle was measured. Then, the ordinal number of the cycle when the discharging capacity first fell below 60% of the discharging capacity in the first cycle was defined as the cycle life.

Here, the relative value of the cycle life of each battery to the cycle life in Comparative Example 1, the latter being regarded as 100, was obtained. The results are shown in Table 1 as the cycle life characteristics ratio.

A larger value of this cycle life characteristics ratio indicates that the battery has better cycle life characteristics.

TABLE 1

|  | Composition | Intensity ratio A | Intensity ratio B | Low-temperature discharge characteristics ratio | Cycle life characteristics ratio |
|---|---|---|---|---|---|
| Example 1 | $La_{0.763}Mg_{0.237}Ni_{3.30}Al_{0.10}$ | 0.02 | 0.03 | 103 | 100 |
| Example 2 | $La_{0.763}Mg_{0.237}Ni_{3.30}Al_{0.10}$ | 0.05 | 0.17 | 114 | 125 |
| Example 3 | $La_{0.763}Mg_{0.237}Ni_{3.30}Al_{0.10}$ | 0.07 | 0.22 | 110 | 100 |
| Comparative Example 1 | $La_{0.763}Mg_{0.237}Ni_{3.30}Al_{0.10}$ | 0.02 | 0.02 | 100 | 100 |
| Comparative Example 2 | $La_{0.763}Mg_{0.237}Ni_{3.30}Al_{0.10}$ | 0.14 | 0.31 | 102 | 96 |

(3) Consideration

From the results in Table 1, it was confirmed that all of Examples 1, 2, 3 and Comparative Example 2 had better low-temperature discharge characteristics and had longer discharging time in low temperature environments than Comparative Example 1. Moreover, it was also confirmed that Examples 1, 2 and 3 exhibited cycle life characteristics equal to or higher than those in Comparative Example 1. On the other hand, it was confirmed that Comparative Example 2 was inferior in cycle life characteristics to Comparative Example 1.

The nickel-metal hydride secondary batteries of Examples 1, 2, and 3 each included a negative electrode including a hydrogen absorbing alloy that had a single composition and was composed of a plurality of crystal phases, and when measuring a X-ray diffraction pattern for each alloy by using Cu-Kα rays as a X-ray source, the intensity ratio A represented by I1/I2 was in the range of $0.02 \leq A < 0.14$ and the intensity ratio B represented by I3/I2 was in the range of $0.02 < B < 0.31$, wherein I1 represents the intensity of the diffraction peak at $2\theta=30.3°$, I2 represents the intensity of the diffraction peak at $2\theta=32.8°$, and I3 represents the intensity of the diffraction peak at $2\theta=31.5°$. From the above-described results, it is found that nickel-metal hydride secondary batteries as of Examples 1, 2, and 3 enable improvement in the low-temperature discharge characteristics without lowering the cycle life characteristics, compared with nickel-metal hydride secondary batteries including a negative electrode including a hydrogen absorbing alloy having intensity ratio A and intensity ratio B out of the above-described ranges as in Comparative Examples 1 and 2.

Namely, setting the ranges of intensity ratio A and intensity ratio B described above to $0.02 \leq A < 0.14$ and $0.02 < B < 0.31$, respectively, is effective for improving the low-temperature discharge characteristics without lowering the cycle life characteristics. In particular, when intensity ratio A and intensity ratio B exceed the above-described ranges as in Comparative Example 2, the cycle life characteristics are lowered, and it is thus difficult to achieve both the low-temperature discharge characteristics and the cycle life characteristics.

From the above, it can be said that, by setting the ranges of the aforementioned intensity ratio A and intensity ratio B to $0.02 \leq A < 0.14$ and $0.02 < B < 0.31$, respectively, the problematic trade-off relationship between the low-temperature discharge characteristics and the cycle life characteristics in conventional nickel-metal hydride secondary batteries can be improved to obtain the nickel-metal hydride secondary batteries having high low-temperature discharge characteristics without lowering the cycle life characteristics.

Embodiments of the invention being thus described, it will be obvious that the same may be varied in many ways. Such variations are not to be regarded as a departure from the spirit and scope of the invention, and all such modifications as would be apparent to one skilled in the art are intended to be included within the scope of the following claims.

What is claimed is:

1. A negative electrode for nickel-metal hydride secondary batteries, the negative electrode comprising a hydrogen absorbing alloy, wherein the hydrogen absorbing alloy consists of a single chemical composition and is composed of a plurality of crystal phases, wherein the single composition is represented by a general formula: $Ln_{1-x}Mg_xNi_{y-z}Al_z$ wherein Ln represents at least one element selected from Zr and rare earth elements, and the subscripts x, y, and z satisfy $x \leq 0.30$, $3.3 \leq y \leq 3.6$, and $z \leq 0.25$, respectively.

2. The negative electrode according to claim 1, wherein: when an X-ray diffraction pattern for the plurality of crystal phases is measured by using Cu—Kα rays as an X-ray source, an intensity ratio A represented by I1/I2 is in a range of $0.02 \leq A < 0.14$ and an intensity ratio B represented by I3/I2 is in a range of $0.02 < B < 0.31$, wherein I1 represents an intensity of a diffraction peak at $2\theta=30.3°$, I2 represents an intensity of a diffraction peak at $2\theta=32.8°$, and I3 represents an intensity of a diffraction peak at $2\theta=31.5°$.

3. The negative electrode according to claim 1, wherein the Ln is La.

4. A nickel-metal hydride secondary battery comprising a container and a group of electrodes housed together with an alkaline electrolytic solution in the container, wherein the group of electrodes comprises a positive electrode and a negative electrode that are superposed on each other with a separator interposed therebetween, and the negative electrode is the negative electrode according to claim 1.

* * * * *